United States Patent [19]

Kaneko et al.

[11] 4,443,115
[45] Apr. 17, 1984

[54] ELECTRONIC TIMEPIECE WITH ELECTROCHROMIC DISPLAY

[75] Inventors: Noboru Kaneko; Junichi Tabata, both of Tokyo, Japan

[73] Assignee: Seiko Instruments & Electronics Ltd., Tokyo, Japan

[21] Appl. No.: 221,979

[22] Filed: Jan. 2, 1981

[30] Foreign Application Priority Data

Jan. 14, 1980 [JP] Japan .................. 55-2721

[51] Int. Cl.³ .................. G04C 19/00; G09F 9/00; G02F 1/17
[52] U.S. Cl. .................. 368/82; 368/239; 340/785; 350/357
[58] Field of Search .................. 368/82, 239; 340/785; 350/357

[56] References Cited

U.S. PATENT DOCUMENTS

| | | | |
|---|---|---|---|
| 3,950,936 | 4/1976 | Oguey et al. | 340/785 |
| 4,057,739 | 11/1977 | Otake | 340/785 |
| 4,201,984 | 5/1980 | Inami et al. | 340/763 |
| 4,229,080 | 10/1980 | Take et al. | 350/357 |
| 4,256,380 | 3/1981 | Barclay et al. | 350/357 |
| 4,372,000 | 1/1982 | Uede et al. | 340/785 |

*Primary Examiner*—Vit W. Miska
*Attorney, Agent, or Firm*—Robert E. Burns; Emmanuel J. Lobato; Bruce L. Adams

[57] ABSTRACT

An electronic timepiece provided with an electrochromic display device as a time related information display.

The ECD is driven by an electric charge transfer method. The electric charges which cause coloration of segments directly transfer from non-selected segments to selected segments.

In the ECD additional concealed dummy segments temporally store the excess electric charges when the total area of the selected segments decreases, and release the stored electric charges when the total area of the selected segments increases, so that the electric charge density of colorized segment is always kept constant. Moreover electric charges are periodically supplied to the display device so as to compensate the lost amount which was dissipated during transfer cycle.

16 Claims, 16 Drawing Figures

ELECTRONIC TIMEPIECE WITH ELECTROCHROMIC DISPLAY

BACKGROUND OF THE INVENTION

The present invention relates to an electronic timepiece provided with an electrochromic display device (referred to as an ECD hereafter) as a display device.

Conventionally, a light emitting diode or a liquid crystal display device is employed as a display device in an electronic timepiece, especially in a digital display type electronic timepiece for displaying time information by numerals, letters, symbols and the like. However, the light emitting diode of the active type is disadvantageous due to its large power consumption and inability to read out display information when in a strong light environment. The liquid crystal display device cannot realize a high contrast display although it is of a passive type, and since the contrast of the display has a visual angle dependency, the visibility of the display depends on the visual angle of the abserver.

In comparision with the conventional display device having the above mentioned drawbacks, an ECD of the passive type has a vivid color display and realizes a high contrast display which is conspicuous at all angles since the display does not have visual angle dependency. Further, the power consumption of the ECD is less than the light emitting diode.

BRIEF SUMMARY OF THE INVENTION

Although the ECD is excellent as the display device as illustrated above, there is a difference in coloration density between the various colored display segments, and the display segments display unwanted numerals and letters when the display information is changed in the conventional driving method. Therefore, there have been problems in seeking to employ the ECD as the display device in the an electronic timepiece, and ECD electrochromic timepieces have generally not been put into a practical use.

The conventional ECD driving method is inconvenient since a difference in coloration density between the colored segments occurs and unwanted or unintentional numerals and characters appear when the display information changes. Accordingly an electric charge transfer driving method has been proposed by the inventors as a new driving method. However, it is still a problem to incorporate the ECD into an electronic timepiece since the coloration density gradually deteriorates by loss of electric charge during repeated transfers in the electric charge transfer method.

Accordingly, it is an object of the present invention to eliminate the above noted drawbacks and to provide an electronic timepiece of the ECD display type driven by a new driving method.

It is another object of the present invention to provice an electonic timepiece having a uniform display color obtained by using an electric charge transfer driving method.

It is another object of the present invention to provide an electronic timepiece provided with a display device of a fixed coloration density.

It is another object of the present invention to provide an electronic timepiece which changes the display rapidly by applying a voltage to the ECD panel in a simple manner.

It is another object of the present invention to provide an electronic timepiece in which a time generating signal or an output signal of a frequency divider is used as the means of timing the display change and the injection of a compensating electric charge.

It is another object of the present invention to provide an electronic timepiece in which the number and the area of display electrodes and dummy electrodes are fixed, and a distance between the display electrodes and the dummy electrodes is fixed in order to hold the constant coloration density and to improve the coloration speed.

It is another object of the present invention to provide an electronic circuit, particularly an electronic timepiece circuit, for realizing the electric charge transfer driving method.

It is another object of the present invention to provide an electronic timepiece having a display of a uniform coloration density between the display segments.

It is another object of the present invention to provide an electronic timepiece in which a display device has constantly fixed coloration density by compensating for losses on transferring the electric charge.

It is another object of the present invention to provide an electronic timepiece in which a timing for compensating the electric charge is appropriately executed using output signals from a time counter in an electronic circuit.

It is another object of the present invention to provide an electronic timepiece in which a timing for compensating the electric charge is appropriately executed by discriminating a display condition of the ECD panel.

DETAILED DESCRIPTION OF THE INVENTION

Figure 1:
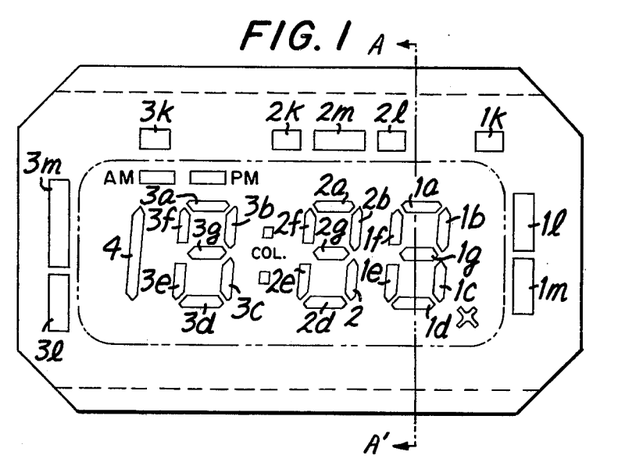
FIG. 1 shows a plan view of an embodiment of the ECD panel according to the present invention.

FIG. 1 is a plan view of an embodiment of an ECD panel used for an electronic timepiece according to the present invention. In this embodiment, time information is indicated by display segments (1a, 1b, ... 3g, 4) forming 3½ digits in the form of a segmented FIG. 8, a colon mark (COL.), an AM mark (AM) and a PM mark (PM) disposed inside a two dot chain line in the drawing, and the life of a battery cell is indicated by a battery cell life alarm mark (X). Segments disposed outside of the two-dot chain line are called dummy segments as will be illustrated later.

Figure 2:
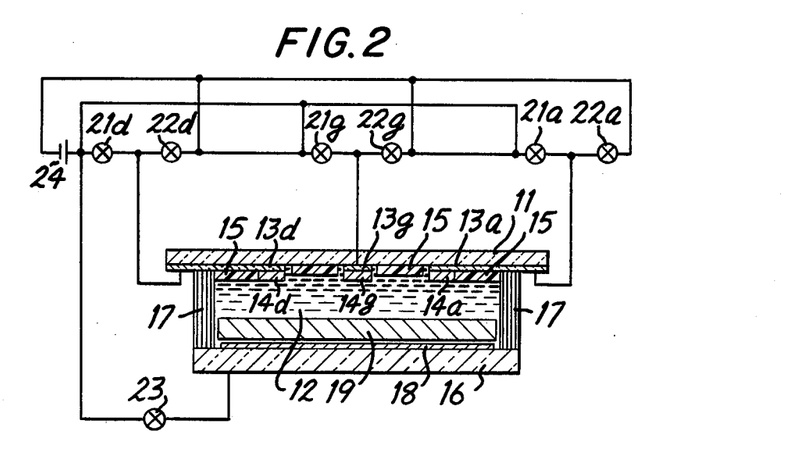
FIG. 2 shows a sectional view of the ECD panel taken on line A—A' in FIG. 1, FIGS. 3 and 4 respectively show the maximum coloration display state and the minimum coloration display state of the display segments on the ECD panel shown in FIG. 1.

FIG. 2 shows a sectional view taken on line A—A' of FIG. 1. The structure of the ECD panel according to the present embodiment will be illustrated in conjunction with FIG. 2. Transparent electrodes 13a, 13d and 13g are formed on a plane surface of a transparent substrate 11 which is in contact with an electrolyte 12 by evaporating an electroconductor such as $In_2O_3$ or the like, and EC layers 14a, 14d and 14g formed by evaporating $WO_3$ or $MoO_3$ in the shape of the display segments 1a, 1d and 1g shown in FIG. 1 are formed on the transparent electrodes. On the region other than the segment pattern region, i.e., the region other than where the EC layers 14a, 14d and 14g are disposed, an insulating film 15 is formed with $SiO_2$. The electrolyte 12 is sandwiched between the substrate 11 and a substrate 16 facing each other, and a counter electrode 18 formed by Au or the like is disposed on the plane surface of the substrate 16 which is in contact with the electrolyte 12. A background plate 19 which is the background of the display is disposed between the substrate 11 and the substrate 16.

This ECD panel is driven by an electric charge transfer method as a new driving method in the electronic timepiece according to the present invention.

Subsequently, the electric charge transfer method will be illustrated in conjunction with FIG. 2 showing both a sectional view of the ECD panel and an electric circuit diagram. Switches 22a, 22d and 22g are coloration switches connected respectively to the transparent electrodes 13a, 13d and 13g and a cathode of a battery 24. Switches 21a, 21d and 21g are bleaching switches connected respectivly to the transparent electrodes 13a, 13d and 13g and an anode of the battery 24. A switch 23 for injecting the coloration electric charge is connected to the counter electrode 18 and the anode of the battery 24.

The operation of the ECD panel driven by the electric charge transfer method will now be illustrated.

Initially, the coloration electric charge is injected into the ECD panel. When the switch 22a and the switch 23 are turned ON, a current flows from the couter electrode 18 to the display segment 1a, and the EC layer 14a is deoxidized and colored. The coloration density depends on the density of the current-flowing electric charge. When the ECD panel reaches a predetermined coloration density, the switch 22a and the switch 23 are turned OFF. Then the EC layer 14a holds the deoxidized state and the display segment 1a holds the coloration state: this is what is called a memory state of the display segment. The coloration electric charge is supplied and accumulated in the ECD panel, and the display segment 1a is colored.

When the switch 22d and the switch 21a are tuned ON, the anode of the battery 24 is connected to the display segment 1a, and the cathode of the same is connected to the display segment 1d. The coloration electric charge is discharged from the segment 1a and transferred through the electrolyte 12 and injected into the segment 1d. Consequently the segment 1a changes from the coloration state to the bleached state, and the segment 1d colors and the display condition changes. The amount of the electric charge transferred from the segment 1a to the segment 1d equals the amount of the electric charge previously supplied and accumulated by the current flow from the counter electrode 18 to the segment 1a. Namely, in the electric charge transfer driving method in which a voltage is applied between the segments undergoing change, no electric charge other than the electric charge accumulated in the ECD panel is transferred. If the area of the segment 1a equals that of the segment 1d (i.e., the areas of the EC layers), the coloration density of the segment 1d after the change of the display equals that of the segment 1a before the change of the display since the densities of the coloration electric charges are the same.

The driving principle of the electric charge transfer driving method has been illustrated so far. In case the ECD panel is driven by the electric charge transfer driving method in FIG. 1, the total area of the display segments which changes into the coloration state is not always equal to the total area of the segments which changes into the bleached state inside the region of the two dot chain line. If the total areas of the segments are not equal, a difference in the electric charge density between the segments occurs after the electric charge transfer. Therefore, it is necessary to included additional segments which are termed "dummy segments" so that the total area of the segments which changes into the coloration state equals the total area of the segments which changes into the bleached state in order to constantly equalize the electric charge density after the electric charge transfer. The segments for displaying the time information are named "display segments" to be distinguished from the dummy segments.

The dummy segments may be disposed on the same surface as the display segments is as shown in FIG. 1. Dummy segments 1k to 1m correspond to a first digit 1 (the segments 1a to 1g), dummy segments 2k to 2m correspond to a second digit 2 (the segments 2a to 2g), and dummy segments 3k to 3m correspond to a third digit 3 (the segments 3a to 3g) and the segment 4. These dummy segments are covered with a cover or otherwise masked (not shown) in order that the dummy segments are not visible. Each area of the display segments 1a to 3g is uniform, and the area of the display segment 4 is twice as large as each area of the segments 1a to 3g. Each area of the dummy segments 1k, 2k, 2e and 3k is equal to that of the display segments, the areas of the dummy segments 1l, 1m, 2m and 3l are twice as large as that of the display segments, and the area 3m is three times as large as that of the display segments.

Figure 3:
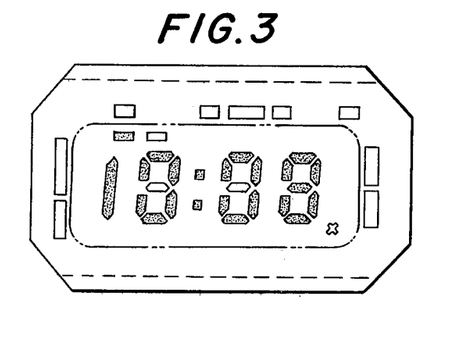
Figure 4:
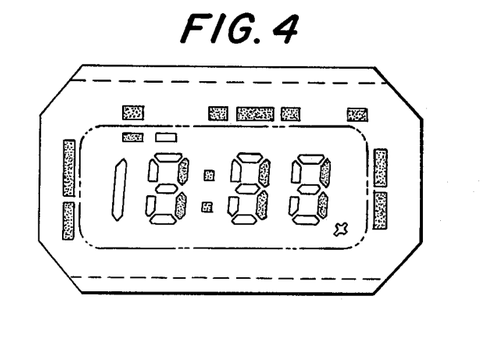

In the case of normal time display in which "hour" information is displayed by the segmented digit 3 and the segment 4 and "minute" information is displayed by the segmented digit 1 and digit 2 using the ECD panel of the electronix timepiece in FIG. 1, the maximum number of display segments are simultaneously colored at 10:38 (shown in FIG. 3) and the minimum number are colored at 1:11 (shown in FIG. 4). Therefore it is sufficient design the display to hold coloration electric charge in the ECD panel to display 10:38. So the total area of the dummy segments corresponding to the digit 1 suffice for that of 5 display segments, the total area of the dummy segments corresponding to the digit 2 suffice for that of 4 display segments, and the total area of the dummy segments corresponding to the digit 3 and the segment 4 suffice for that of 6 display segments. Further, it is necessary to select the dummy segments corresponding to each numeral displayed per each digit in order to change the total area of the dummy segments in the coloration state. Accordingly, the numer of the dummy segments and the ratio between the area of the dummy segments and the area of the display segments are defined as illustrated above.

Table 1 shows the electric charge transfer between the display segments and the dummy segments taking the digit 1 by way of example. Numerals change in the order of 0 1 ... 9 0 ... in Table 1.

TABLE 1

| display | display segments | | | | | | | dummy segments | | |
|---|---|---|---|---|---|---|---|---|---|---|
| | 1a | 1b | 1c | 1d | 1e | 1f | 1g | 1k | 1l | 1m |
| 0 | | | | | O | | X | | | |
| 1 | X | | X | X | X | | | | O | O |
| 2 | O | | X | O | O | | | O | X | X |
| 3 | | | O | | X | | | | | |
| 4 | X | | X | | O | | | O | | |
| 5 | O | X | O | | | | | X | | |
| 6 | | | O | | O | | | | | X |
| 7 | | O | X | X | X | X | X | | O | O |
| 8 | | | O | O | O | O | | X | | X |
| 9 | | | | X | | | | O | | |

In the Table, the mark O indicates the segment changing from the bleached state to the coloration state, to which a 0 volt is applied, the mark X indicates the segment changing from the coloration state to the bleached state, to which a 1.5 volts is applied, and no mark indicates the segments which are not changing state, to which no voltage is applied. For instance, in the case a numeral 9 changes to a numeral 0, the display segment 1e is colored and the display segment 1g is bleached.

The voltage application will be shown in Table 2.

TABLE 2

| $T_{n-1}$ | $T_n$ | Application voltage/state |
|---|---|---|
| bleaching | coloration | 0 volts |
| coloration | bleaching | 1.5 volts |
| bleaching | bleaching | no application |
| coloration | coloration | memory state |

$T_n$ indicates the present state and $T_{n-1}$ indicates the last state.

Moreover, the inventors of the present invention have found that the difference in the coloration density between the colored segments and the difference in the bleaching density between the bleached segments can be effectively eliminated by connecting all the colored segments to a given electric potential, or by connecting all the colored segments to the given electric potential and connecting all the bleached segments to another given electric potential, after the electric charge transfer.

Although no extra dummy segment corresponding to the AM mark is used and the PM mark in this embodiment, since the AM and PM marks are ordinarily colored alternatively, the particular mark which is bleached functions as the dummy segment and the electric charge is alternately transferred between the AM mark and the PM mark.

It is desirable to arrange the dummy segments in the vicinity of the corresponding digits in order to speed up the electric charge transfer and to change the display state quickly.

In the electric charge transfer driving method, however, although the display state of the ECD panel is changed by transferring the initially injected electric charge between the segments, there is a problem that an exceedingly small amount of a transfer loss exists in the case of the electric charge transfer and the coloration density deteriorates with an increase of the number of the electric charge transfers.

Therefore, in the present embodiment, a compensating method for compensating the deteriorated coloration density and a compensating circuit for realizing the compensation are used.

The electronic timepiece according to the present invention is driven by electronic circuitry for producing the driving voltage waveforms illustrated hereinbelow.

The electronic timepiece in the present embodiment is operable in the following modes:

(1) In the normal time display state, i.e., in the normal mode, the time information of "hour. minute" is displayed on the ECD panel.

(2) The normal display state can be changed into a "second" display state or a "month. date" display state by suitably actuating external switches (3) The time information "second. minute. hour. day. month" can be corrected by external switching operations.

In the "second" display state, the "second" is displayed by the digits 1 and 2 for indicating the "second", the colon mark and the AM mark (or the PM mark), and the other digits are bleached by transferring the electric charge to the dummy segments. In the "month. date" display state, the coloration electric charge in the colon mark COL is transferred to the AM mark AM (or the PM park PM) and bleached so as to be distinguished from the "hour. minute" display.

In making display corrections, only the display digits selected to correct the time information are colored in a similar manner to the above-described display mode (2), and when corrected the "date" or the "month", the colon mark is also bleached in order to be distinguished from the "hour. minute" correction.

Figure 5:
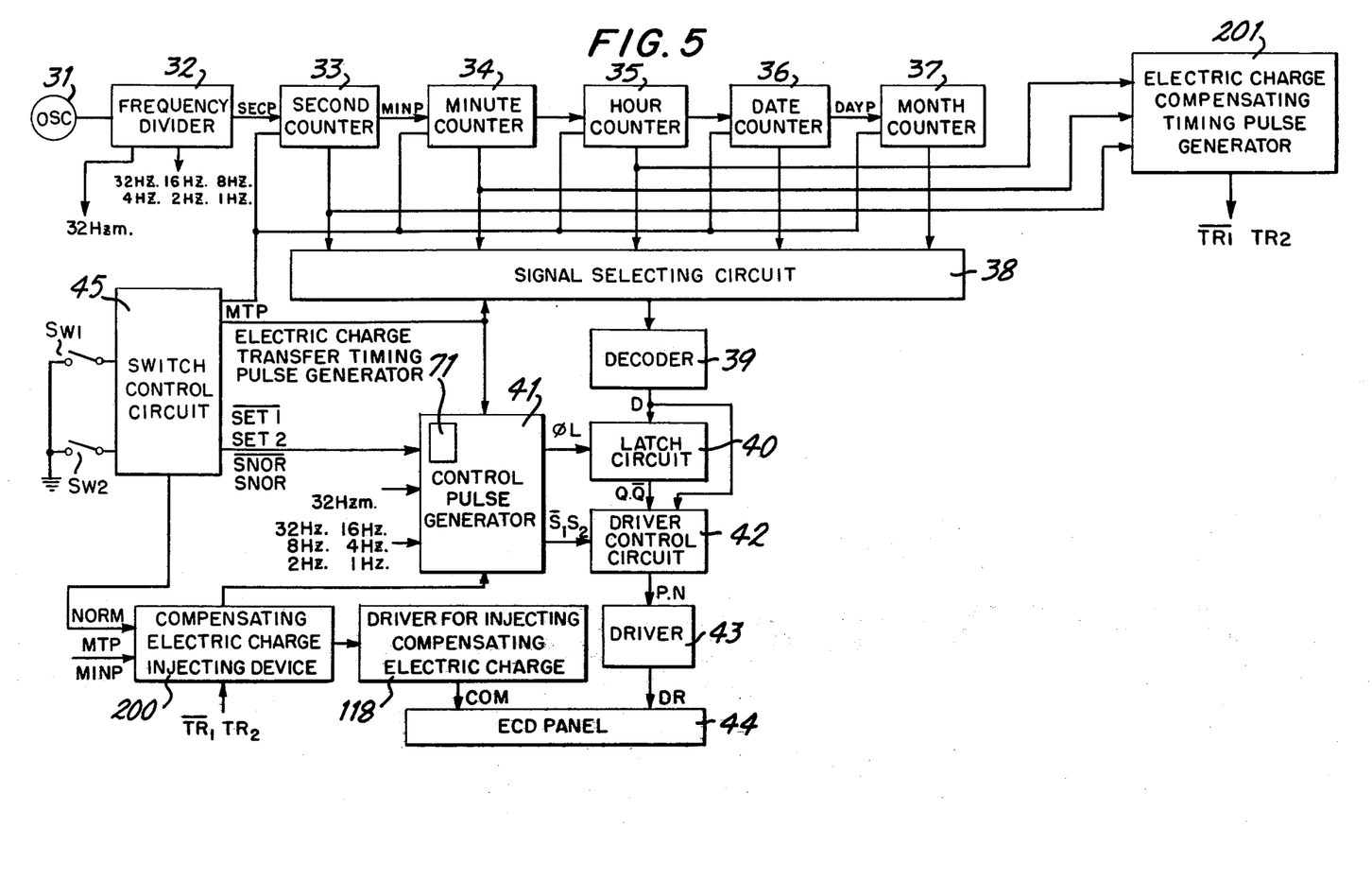
FIG. 5 shows a block diagram of the embodiment of the electronic dircuit circuit according to the present invention.

FIG. 5 shows a block diagram showing the circuit system of the electronic timepiece according to the present invention. The circuit system produces a pulse SECP by a reference signal generator in the form of an oscillator 31 for generating a time reference signal and a frequency divider 32 for dividing the high-frequency signal produced from the reference signal generator 31 into the minimum time unit to be displayed by the timepiece; 1 Hz in this embodiment. The frequency divider 32 produces a plurality of frequency-divided signals which are fed to a control pulse generator 41 for controlling the circuit system of the electonic timepiece according to the present invention. The pulse signal SECP of 1 Hz frequency is fed to a second counter 33 for producing a minute pulse MINP signal. In the same way, a minute counter 34, and hour counter 35, a date counter 36 and a month counter 37 operate by a carry pulse received from the prior stage counter and generate corresponding time information. The time information is fed to a signal selecting circuit 38 and at the same time, is fed as an input signal to an electric charge compensating timing generator 201 which defines the timing for compensating the transferring loss produced by the electric charge transfer method.

The signal selecting circuit 38 receives the output signal from each counter and applies the output signals from the hour and minute counters, the second counter and the month and data counters, respectively changed over by a mode change pulse MTP of a switch control circuit 45, to a decoder 39. A decode signal D of the decoder 39 is fed to a latch circuit 40, and at the same time fed to a driver control circuit 42.

By this circuit system the driver control circuit 42 receives output signals Q and $\overline{Q}$ of the latch circuit 40 and discriminates whether the content of the decoder 39 is changed or not. Discriminating signals P and N of the driver control circuit 42 drive an ECD panel 44 having a 4-digit display (as shown in FIG. 1) via a driver 43.

The manner in which the injection of the compensating electric charge for compensating the loss caused by the electric charge transfer will now be illustrated.

In this embodiment, the compensating electric charge is injected when the ECD panel 44 is in the stable state. The electric charge is injected by the electric charge compensating timing pulse generator 201, a compensating electric charge injecting device 200 and a compensating electric charge injecting driver 118. Output signals $\overline{TR}_1$, $TR_2$ from the compensating electric charge timing pulse generator 201 are applied to the compensating electric charge injecting device 200, one per one hour in this embodiment.

A normal mode signal NORM for indicating the hour and minute display mode, a mode change pulse MTP and the one minute pulse MINP are applied to the compensating electric charge injecting device 200. Accordingly, when the ECD panel 44 is in the stable state, i.e., in the normal mode and at the electric charge compensating timing, the compensating electric charge is injected by driving the compensating electric charge injecting driver 118. However, in case the ECD panel 44 has just been switched into the normal mode state by changing over the mode, it is in the unstable state and so the compensating electric charge injecting driver 118 is not driven.

The one minute pulse MINP is applied to release the non driving state.

By the above mentioned structure, the compensating electric charge is injected when the ECD panel 44 is in the normal state.

Now the electric charge transfer timing, the electric charge transfer time and the method to hold the constant coloration density will be illustrated.

These functions are controlled by the control pulse generator 41. The control pulse generator 41 includes an electric charge transfer timing pulse generator 71. A delay timing pulse CL and electric charge transfer time setting signals $\overline{S}_1$, $S_2$ are produced from the control pulse generator 41.

The electric charge transfer time setting signal $\overline{sS}_1$ serves for discriminating the coloration density between the segments. The driver control circuit 42 produces a control signal for making an electrical connection between the colored segments and the given electric potential by the signal $\overline{S}_1$ after the electric charge transfer is over.

The electric charge transfer time setting signal $S_2$ serves for discriminating the bleached density between the segments. The driver control circuit 42 produces a control signal for making an electrical connection between the bleached segments and the given electric potential by the signal $S_2$ after the electric charge transfer is over.

In this embodiment, the driver control circuit 42 produces the control signals for making an electrical connection between the colored segments and the given electric potential in the normal mode. In the modes other than the normal mode, the control signals are produced for making an electrical connection between not only the colored segments but also the bleached segments.

In the above system, the driving method of the ECD panel will first be illustrated in conjunction with the driving application voltage waveforms shown in FIGS. 6–8, and then the detailed electric circuit will be described.

Figure 6:
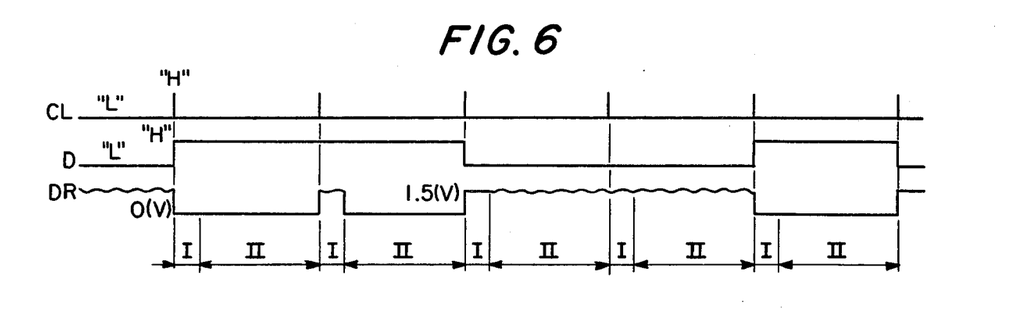
FIGS. 6, 7 and 8 show timing charts and driving voltage waveform charts of the ECD panel driving method of the electronic timepiece according to the present invention.

The driving method of the ECD panel in the normal mode will be illustrated in conjunction with the driving application voltage waveforms shown in FIG. 6.

A signal CL in the drawing is a one minute pulse signal which is a carry output signal of the second counter 33 in the normal mode, and a signal D is an example of the output of the decoder circuit 39.

A voltage waveform DR is a voltage waveform produced from the driver 43 applied to one of the segments of the ECD panel 44.

When the segments are bleached and the decode signal D is at a logic level "L", the voltage DR is not applied to the segments since the driver 43 is in an OFF state (shown by mark in the drawing). In the case the 1 minute pulse is produced, the count information of the counter group is changed and the signal D is changed from "L" to "H", and the voltage DR is a 0 volt for a fixed period of time (a time interval I in the drawing), and the 0 volt condition is held until the next 1 minute pulse signal is produced (a time interval II in the drawing). When the next 1 minute pulse signal is produced, if the decode signal D is at the former state "H", the voltage DR is not applied at the time interval I and 0 volt is applied at the time interval II. When the third 1 minute pulse is produced, if the decode signal is changed from "H" to "L", the voltage DR of 1.5 volts is applied at the time interval I and the voltage DR is not applied at the time interval II. When the fourth 1 minute pulse is produced, if the decode signal D is held at "L" level, the voltage DR is not applied both at the time intervals I and II.

The electric charge is transferred at the time interval I, which is called the electric charge transfer time. In this embodiment, the electric charge transfer time is about 1 second.

It has been confirmed by experiment by the inventors that the electric charge transfer time for 1 second is sufficient to transfer the electric charge in the normal display state. In the time interval II, a 0 volt voltage is applied to the colored segments while no voltage is applied to the bleached segments. Although there is a possibility that a difference in the coloration density occurs between segments after the electric charge transfer, since a 0 volt voltage is applied to all of the colored segments and the colored segments are shorted, the density is averaged by a difference in an electomotive power between the colored segments. The time interval II is called the memory time.

Now the driving method of the ECD panel other than the normal mode will be illustrated.

Figure 7:
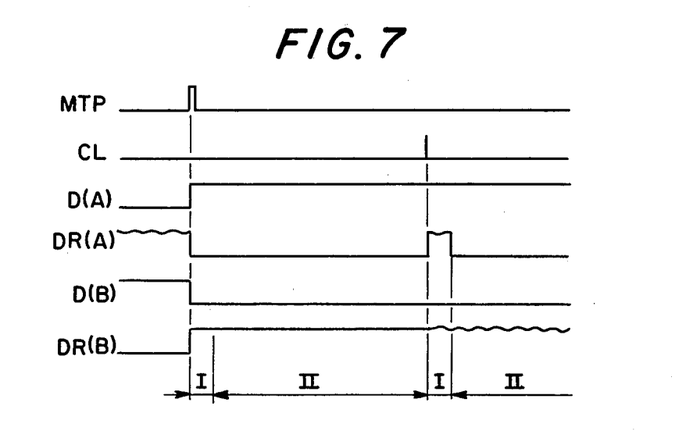

Initially, the case in which the normal display mode is changed over to the "second" display state or to the "month. date" display state will be illustrated in conjunction with FIG. 7.

The change of the display state is called the mode change.

The mode is changed when the mode change pulse MTP from the switch control circuit 45 is fed to the signal selecting circuit 38 by the operation of the external switch SW$_1$. The signal MTP shown in FIG. 7 is the mode change pulse signal, and the signal CL is a 1 second pulse in the "second" display state, a 1 day pulse in the "month. date" display state and a 1 minute pulse in the "hour. minute" display state.

The signal D(A) is one of the output signals of the decoder circuit 39 and the voltage DR(A) denotes the voltage applied to the segments corresponding to the decode signal D(A).

The signal D(B) is one of the other output signals of the decoder circuit 39 and the voltage DR(B) denotes the voltage applied to the segments corresponding to the decode signal D (B). Before changing the mode, the decode signal D(A) is at "L" level and the segments are in the bleaching state, and the decode signal D(B) is at "H" level and the segments are in the coloration state.

When the signal MTP becomes at "H" level and the mode is changed, the decode signal D(A) changes to "H" and the decode signal D(B) changes to "L", then the voltages DR(A) and DR(B) applied to the segments are at 0 volt and 1.5 volts respectively at the electric charge transfer time (I).

At the memory time (II), the voltages DR(A) and DR(B) are respectively at 0 volt and 1.5 volts.

The mode change is different from the normal mode in the point that the 1.5 volts voltage is applied to the bleached segments at the memory time. It is a possibility that the electric charge transfer is not completed by an increase in the number of the segments which change display state.

The application of the 1.5 volts voltage to the bleached segments at the memory time in case of the mode change is kept until the first clock pulse CL is produced after the MTP pulse is produced, and after that, the ECD panel is operated in the same way as the normal mode.

Figure 8:
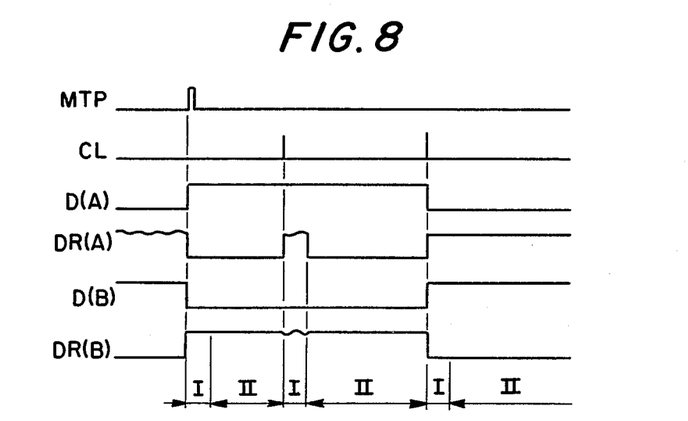

The driving method of the ECD panel in case of the time correction mode will be illustrated in conjunction with FIG. 8.

If the time correction mode is selected by the operation of the external switch SW$_2$, the MTP pulse is produced from the switch control circuit 45 in a similar manner as in the case of the mode change.

The MTP pulse is also produced in the case of selecting the correction figure.

The signal CL serves as a correction SET signal in the time correcting state. Although the ECD panel in the time correction mode is driven in a similar manner as in the normal mode and in case of the mode change at the electric charge transfer time, the 1.5 volts voltage is applied to the bleached segments and the 0 volt voltage is applied to the colored segments at the memory time.

This voltage application is executed at each memory time. This is because the time for the electric charge transfer cannot be taken sufficiently long since the correction SET pulse from the switch control circuit 45 caused by the operation of the external switch SW$_1$ is not produced at the fixed time and at a fixed timing. Therefore, the coloration state and the bleached state are completed by the voltage application at the memory time.

Figure 9:
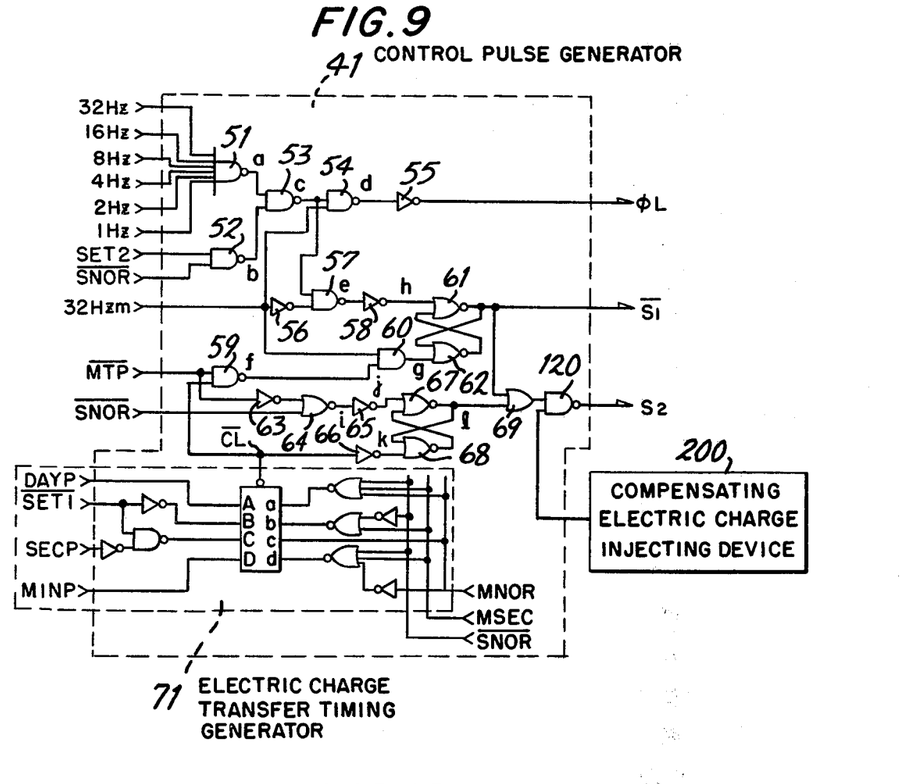
FIG. 9 is a circuit diagram showing an embodiment of the control pulse generating circuit portion according to the present invention.
Figure 10:
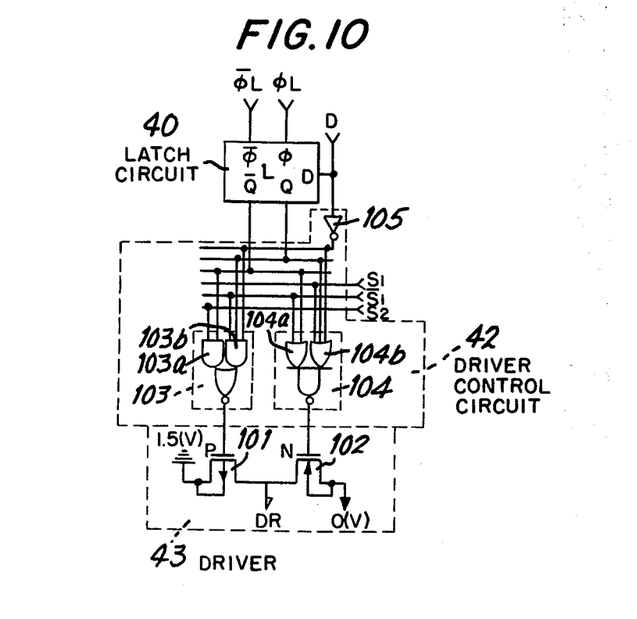
FIG. 10 is a detailed circuit diagram showing an embodiment of the latch circuit, the driver control circuit and the driver.

FIG. 9 shows a detailed circuit diagram of the control pulse generator 41, and FIG. 10 shows a detailed circuit diagram corresponding to 1 segment of the driver control circuit 42 and the driver 43.

As shown in FIG. 9, 1 Hz, 2 Hz, 4 Hz, 8 Hz, 16 Hz and 32 Hz signals produced from the frequency divider 32 are fed to a NAND 51, a signal SET2 and a signal $\overline{\text{SNOR}}$ produced from the switch control circuit 45 are fed to a NAND 52, an output terminal of the NAND 52 and an output terminal of the NAND 51 are connected to a NAND 53, an output terminal of the NAND 53 and a 32 Hz master output 32 Hzm of the frequency divider 32 are fed to a NAND 54 and an output signal of the NAND 54 is produced from a signal $\phi$L generating portion via an inverter 55.

An output terminal of an inverter 56 receiving the 32 Hzm signal and the output terminal of the NAND 53 are connected to a NAND 57. An output terminal of an inverter 58 connected to an output terminal of the NAND 57 is connected to one input terminal of a NOR 61. A signal $\overline{\text{MTP}}$ and the signal $\overline{\text{CL}}$ are fed to a NAND 59 and the output from the same and the 32 Hzm signal are fed to an AND 60, and an output terminal of the same is connected to one input of a NOR 62. An RS flipflop is composed of the NOR 61 and the NOR 62, and a signal $\overline{\text{S}}_1$ produced from the output terminal of the NOR 61.

An output from an inverter 63 receiving the signal $\overline{\text{MTP}}$ and a signal $\overline{\text{SNOR}}$ are fed to a NOR 64, an output terminal of the NOR 64 is connected to an inverter 65, an output terminal of the inverter 65 is connected to one input of a NOR 67. An output terminal of an inverter 66 is connected to one input of a NOR 68, an RS flipflop is composed of the NOR 67 and the NOR 68, and an output terminal from the NOR 67 and an output terminal of the NOR 61 are connected to an input terminal of an OR 69, an output terminal of the OR 69 and an output terminal of the compensating electric charge injecting device 200 are connected to a NAND 120 and the NAND 120 produces a signal S$_2$.

An electric charge transfer timing generator 71 produces the signal CL, the 1 minute pulse in the normal mode, a correction SET pulse for fast forwarding $\overline{SET}$ in the case other than the "second" correction state of the time correction mode, a one day pulse in the "month. date" display state, an OR output signal of the 1 second pulse and the correction SET pulse in the correcting state by changing over the pulses.

Figure 11:
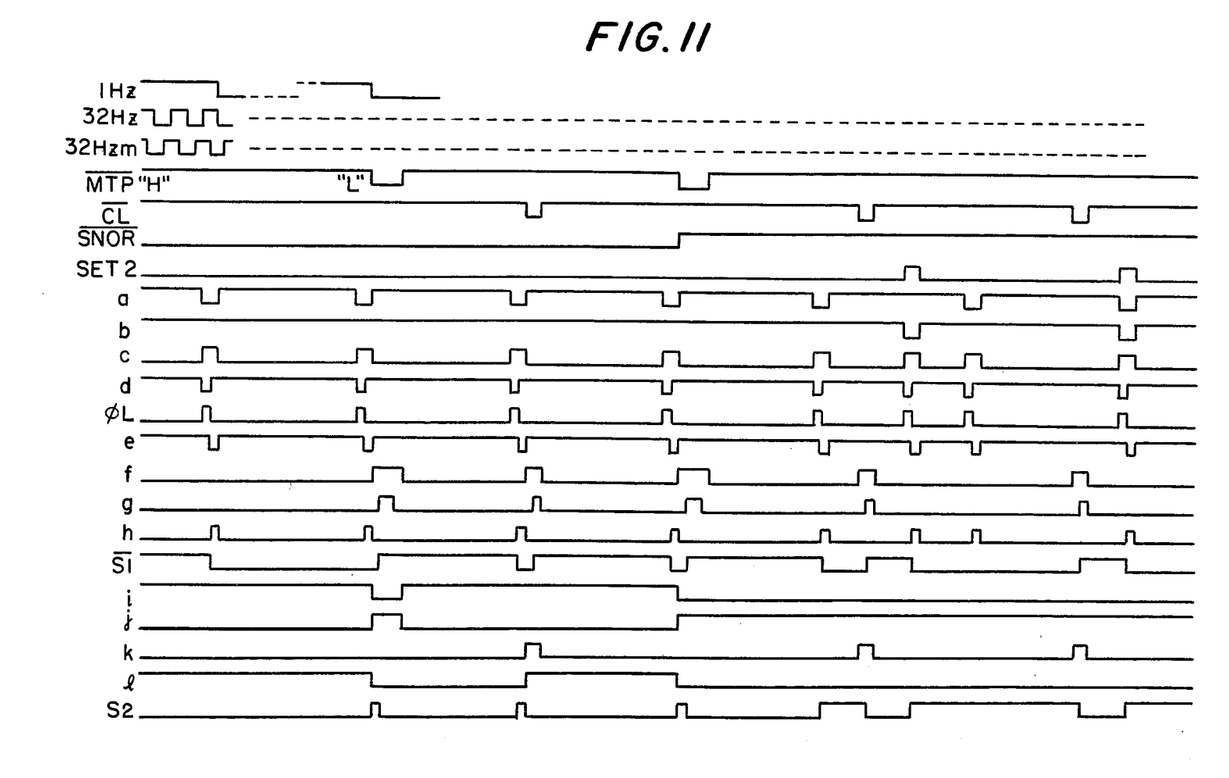
FIGS. 11 and 12 show operation timing waveform charts of the electronic circuit shown in FIGS. 9 and 10.

The timing waveforms of the various connecting points of the electronic circuit shown in FIG. 9 are shown in FIG. 11, and the operation of the circuit will be illustrated with reference to the timing waveforms. A signal "a" having a pulse width of 1/64 sec occurs immediately before the timing that the trailing edge of a 1 Hz signal appears at the NAND 51, and an inverted signal of the signal "a" is produced at the NAND 53 (a signal "c"). The signal "c" and the 32 Hzm signal are fed to the NAND 54 and a NAND output signal "d" is produced at the NAND 54, further the signal "d" is inverted by the inverter 55 and the signal L is produced. The signal $\phi L$ cycles at 1 sec increments. The inverted signal of the 32 Hzm signal by the inverter 56 and a NAND output signal "e" of the signal "c" are produced from the NAND 57. The signal MTP and the signal CL are fed to the NAND 59, and a NAND output signal "f" and the 32 Hzm signal are fed to the AND 60. An AND output "g" and a short time setting signal "h", which is the inverted signal of the signal "e" inverted by the inverter 58, are fed to the R-S flipflop which serves as the memory circuit to thereby drive it. The R-S flipflop composed of the NORs 61 and 62 produces a signal $\overline{S}_1$ at "H" level when the signal "g" is at "H" level and produces the signal $\overline{S}_1$ at "L" level when the signal "h" is at "H" level.

The inverted signal of the signal $\overline{MTP}$ inverted by the inverter 63 and a NOR output signal "i" of the signal $\overline{SNOR}$ are produced from the NOR 64. The R-S flipflop composed of the NORs 67 and 68 is driven by an inverted signal "j" of the signal "i" inverted by the inverter 65 and an inverted signal "k" of the signal $\overline{CL}$. An output signal " " of the R-S flipflop is set at "L" level when the signal "j" is at "H" level, and the signal "l" is at "H" level when the signal "j" is at "L" level and the signal "k" is at "H" level.

When the timepiece is in the time correction mode, the signal $\overline{SNOR}$ is at "H" level. So a signal "l" is set at "L" level in the time correction mode. The OR 69 produces the OR signal of the signal "l" and the signal $\overline{S}_1$, and the signal $S_2$ is at "H" level when both the signal $\overline{S}_1$ and the signal "l" are at "L" level.

The latch circuit 40 and the driver control circuit 42 are controlled by each of the signals produced from the control pulse generator 41 illustrated above, and the driver 43 is driven by the driver control circuit 42. A detailed circuit diagram of the driver control circuit 42 and the driver 43 will be shown in FIG. 10.

The signal $\phi$ produced from the control pulse generator 41 and an inverted signal $\overline{\phi L}$ are fed to clock input terminals $\phi$, $\overline{\phi}$ of the latch circuit 40. One segment signal of the decoder 39 is fed to the data input terminal D. The driver control circuit 42 comprises an AND-NOR circuit 103 connected to a gate terminal of a P channel MOSFET 101 of the driver 43 which consists of the P channel MOSFET 101 and an N channel MOSFET 102, and an OR-NAND circuit 104 connected to a gate terminal of the NMOSFET 102.

The $\overline{Q}$ output of the latch circuit 40 and the signal $S_2$ are fed to a 2-input AND 103a of the AND-NOR circuit 103. An output terminal of an inverter 105 which receives the decode signal D, the Q output of the latch circuit 40 and the signal $\overline{S}_1$ are connected to a 3-input AND 103b. To a 2-input OR 104a of the OR-NAND 104 are fed the $\overline{Q}$ output and the signal $\overline{S}_1$ and to a 3-input OR 104b of the OR-NAND 104 are fed the output from the inverter 105, the Q output and the signal $\overline{S}_1$.

A drain of the MOSFET 101 and a drain of the MOSFET 102 are connected together in the driver, and the connecting point is connected to the corresponding segments of the ECD panel. A source of the MOSFET 101 is connected to a 1.5 volts terminal of the power source and a source of the MOSFET 102 is connected to a 0 volts terminal of the power source.

Figure 12:
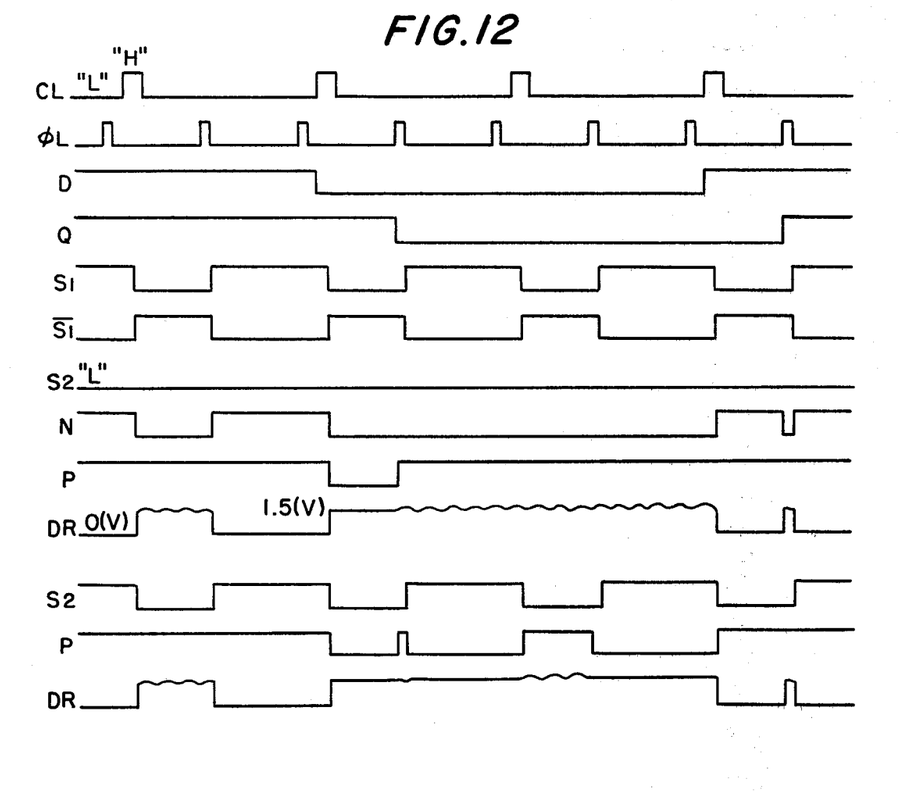

The circuit operation of the above mentioned structure will now be described with reference to the waveforms of the signals shown in FIG. 12 at each of the connecting points.

The latch circuit 40 latches the decode-signal D at the time interval when the logic level of the signal $\phi L$ is at "L" level. The decode signal D switches between "H" and "L" synchronized with the clock CL, and the output Q of the latch circuit 40 is latched by the above operation. The signal $\overline{Q}$ is an inverted signal of the signal Q.

In the case the decode signal is at "H" level and the signal Q is at "L" level when the signal $S_1$ is at "L" level and the signal $\overline{S}_1$ is at "H" level, an output signal N of the OR-NAND circuit 104 which controls the N channel MOSFET 102 is at "H" level. In the case both the decode signal D and the signal Q are at "H" level when the signal $S_1$ is at "H" level and the signal $\overline{S}_1$ is at "L" level, the signal N is at "H" level. In other cases, the signal N is at "L" level by the OR-NAND circuit 104.

In the case the decode signal D is at "L" level and the signal Q is at "H" level when the signal $\overline{S}_1$ is at "H" level and the signal $S_2$ is at "L" level, an output signal P of the AND-NOR circuit 103 for controlling the P channel MOSFET 101 returns to "L" level. In the case the signal Q is at "L" level when the signal $S_1$ is at "L" level and the signal $S_2$ is at "H" level, the signal P turns to "L" level.

The signal N and the signal P are produced by the above operation, and the N channel MOSFET 102 is turned ON when the signal N is at "H" level and the P channel MOSFET 101 is "ON" when the signal P is at "L" level in the driver. Since the "L" level signal at the AND-OR circuit 103 and the "H" level signal at the OR-NAND circuit 104 are not produced simultaneously, the MOSFETs 101 and 102 are not turned ON at the same time. In this manner, the driver produces a 1.5 volts output when the P channel MOSFET 101 is turned ON and produces a 0 volts output when the N channel MOSFET 102 is turned ON.

Now the compensating method for compensating for the coloration density deteriorated by the transfer loss and the compensating circuit for realizing the compensation will be described.

In the embodiment, the coloration density is compensated by applying a 1.5 volts voltage to the counter electrode at each predetermined number of the electric charge transfers for a predetermined period.

On this occasion, a 0 volts voltage is applied to the colored segments and a 1.5 volts voltage is applied to the bleached segments in the same way as the counter electrode on the ECD panel. Then a current flows between the counter electrode and the colored segments, and the electric charge is injected for compensation to recover the deteriorated coloration density. A 1.5 volts voltage is applied to the bleached segments in order to bleach the coloration of the bleached segments by a photochromic reaction. The current-flowing time between the counter electrode and the colored segments is previously set so that the amount of the electric charge injected for compensating the deteriorated coloration density equals the amount of the electric charge lost in the predetermined number of the electric charge transfers in the ECD panel.

Accordingly, the amount of the total coloration electric charge held in the ECD panel equals the amount of the electric charge initially injected when the coloration density is compensated, so the coloration density is not deteriorated.

In this embodiment, the coloration density is compensated at the timing every hour on the given minutes plus 30 seconds in the normal mode.

The uniformity of the coloration density of the ECD panel is more stable in the normal mode than in the case of the mode change or time correction mode. The compensation is carried out at the timing of the given minutes plus 30 seconds since the coloration density is averaged by the short-circuit at the memory time, so that the coloration density can be averaged at the memory time even if the non-uniformity of the coloration density occurs after the compensation.

Figure 13:
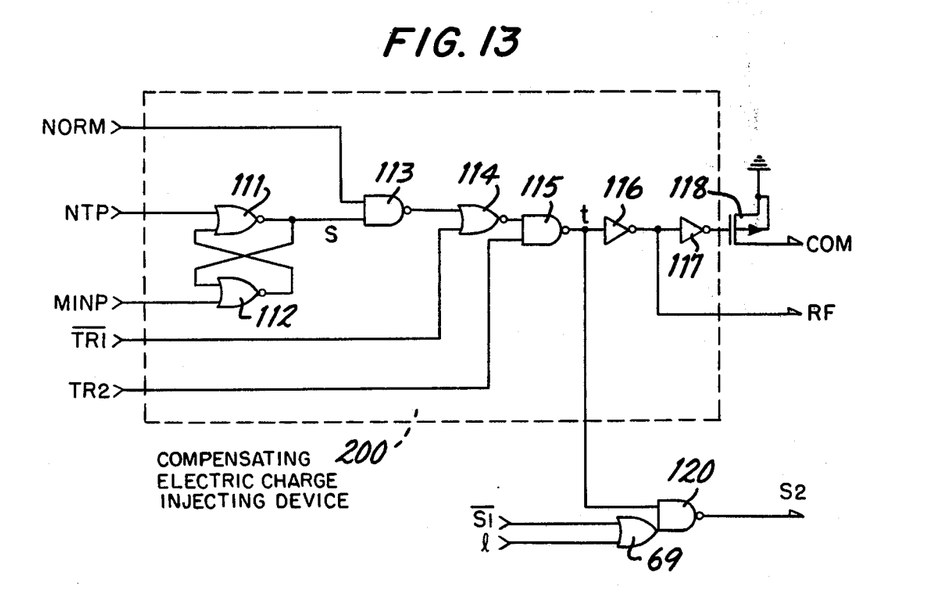
FIG. 13 shows an embodiment of the compensating electric charge injecting device according to the present invention.

One embodiment of circuit for injecting the compensating electric charge will be illustrated in conjunction with FIG. 13. The circuit comprises an RS flipflop which consists of NORs 111 and 112 which receive the mode change plus MTP and the 1 minute pulse MINP, a NAND 113 which receives the output signal of the NOR 111 and a signal NORM, a NOR 114 which receives the output signal of the NAND 113 and a timing signal $\overline{TR_1}$, a NAND 115 which receives the output signal of the NOR 114 and a timing signal $TR_2$ for regulating the injection time of the compensating electric charge, buffers 116 and 117, and a driver 118 for injecting a compensating electric charge consisting of a P channel MOSFET. The driver is connected to the counter electrode 18.

Figure 14:
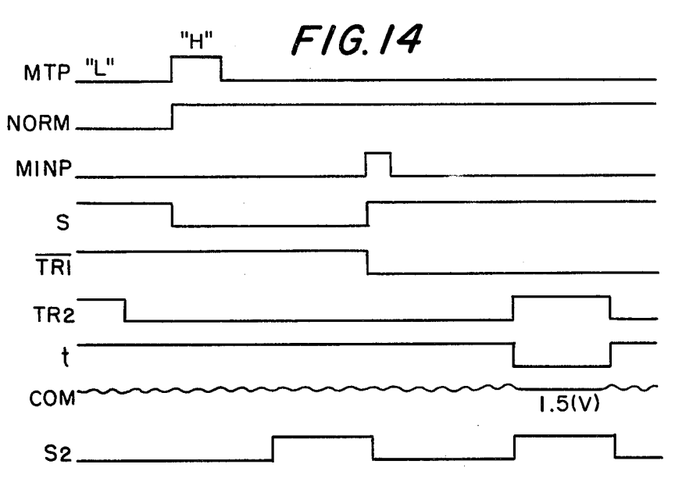
FIG. 14 shows a timing chart and a driving voltage waveform chart showing an embodiment in FIG. 13.

The circuit operation of FIG. 13 will now be described in conjunction with the timing chart in FIG. 14. When the signal MPT produces an "H" pulse, the mode is changed over to the normal mode, and the normal display state signal NORM changes from "L" to "H". The output from the NOR 111, i.e. the logic level of a contact S is "L" by the signal MTP. The logic level of the contact S holds the "L" level since the R-S flipflop holds the state until the first 1 minute pulse signal MINP is produced after the "H" pulse is produced from the signal MTP. When the contact S is "L", the P channel MOSFET 118 is turned OFF even in the normal mode and the compensating injection voltage COM is not produced. When "H" is produced from the 1 minute pulse signal MTP, the contact S is inverted and becomes "H". On this occasion, if the signal $\overline{TR_1}$ is "L" at the compensating time "minute", "L" is produced from the NAND 115 by the injection time regulating signal $TR_2$ while $TR_2$ is "H", and the P channel MOSFET 118 is turned ON, and the compensating injection voltage COM is at 1.5 1 volts, and the compensating injection of the electric charge is carried out. The pulse width of $TR_2$ is set so that the loss of the electric charge may be compensated.

Further, a 1.5 volts voltage is applied to the bleached segments when the compensating injection of the electric charge is carried out.

As illustrated above, the ECD panel is driven without changing the coloration density by injecting the coloration electric charge for compensation according to the electric charge transfer driving method.

Figure 15:
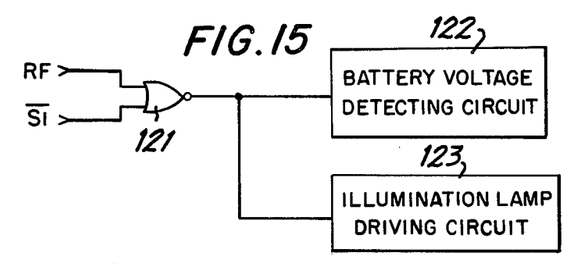
FIG. 15 shows an embodiment of the control circuit for the battery voltage detecting circuit and illumination lamp driving circuit.
Figure 16:
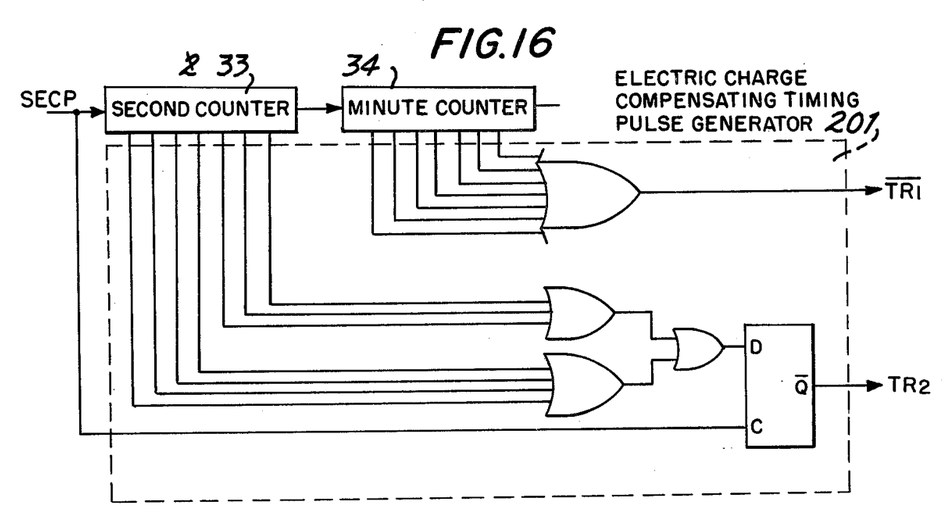
FIG. 16 shows an embodiment of the electric charge compensating timing pulse generation according to the present invention.

A voltage detecting circuit and a lamp driving circuit are also incorporated in the electronic timepiece. The voltage detecting circuit teaches a voltage drop by changing the display on the panel when the battery voltage drops below a fixed predetermined level. However, the battery voltage is sometimes less than the detection voltage of the battery detecting circuit on driving the ECD panel, due to the internal resistance of the battery, since a larger current than in the static condition flows in the circuit when the electric charge is transferred and when the electric charge is injected for compensation. A voltage drops in the same way when a lamp for illumination is lighted by a large current flow. So there is a danger that the electric charge transfer and the compensating injection of the electric charge are not fully carried out. Accordingly, in the present embodiment, the operation of a battery voltage detecting circuit 122 and an illumination lamp driving circuit 123 is prohibited by a NOR 121 shown in FIG. 15 in the case the electric charge is transferred and the electric charge is injected for compensation. Although a lamp driving circuit has been shown in this embodiment, it is to be noted that another large current consuming device may be used in the same way.

In the case a drop of the battery voltage is detected, a 0 volt is applied to the ✖ mark segment on the ECD panel shown in FIG. 1 in this embodiment, and an indication of the battery life is displayed by illuminating the ✖ mark.

According to the present embodiment, the ECD is used as the display device of the electronic timepiece and the ECD panel is driven by the electric charge transfer driving method. The electric charge transfer driving method realizes the display of the fixed amount of the total coloration electric charge, the fixed area of the total colored segments and the constantly fixed coloration density since non-uniformity of the coloration density between the segments is prevented by establishing a short circuit connection between the colored segments.

Further, the display states are changed speedily without displaying unwanted numerals by the simultaneous coloration and bleaching operations.

Since the present invention comprises the compensating method for compensating the deteriorated coloration density correctly and the compensating electric charge injecting device for realizing the compensation, the coloration density is not deteriorated with an increase in the number of the electric charge transfers.

Moreover, the electronic timepiece having the display of uniform coloration density is realized by the compensating means for difference in coloration density between segments which compensates for the coloration density.

Besides, according to the present invention, the coloration density is not deteriorated in accordance with an increase in the electric charge transfer circuit with the function of the compensating electric charge injecting device which compensates for the coloration density lost and deteriorated by the electric charge transfer.

Further, the present invention realizes the electronic timepiece in which the coloration density is correctly compensated executing the electric charge compensating timing appropriately.

What is claimed is:

1. In an electronic timepiece operable in at least a normal display mode for keeping and displaying time information: an electrochromic display device comprising display segments having colored and bleached states for displaying time information, and dummy segments having colored and bleached states and which are not used for the display of time information but to which, when the device is driven, electric charges are transferred, the areas of the dummy segments being so chosen in relation to those of the display elements that, when the total colored area of the display segments is changed to change the time information displayed, the total area of segments including both the dummy segments and the display segments remains substantially constant and the coloration density of the display remains substantially unchanged; circuit means for periodically setting an electric charge transfer time during which electric charge transfer occurs between selected segments and a memory time during which the segments retain their colored or bleached states; means for selectively applying negative voltage to segments which are selected to change from the bleached state at a time $t_{n-1}$ to the colored state at another time $t_n$; and means for selectively applying a positive voltage to segments which are selected to change from the colored state at a time $t_{n-1}$ to the bleached state at a time $t_n$, no voltage being applied to segments which are not required to change from the colored state to the bleached state during the electric charge transfer time.

2. An electric timepiece as claimed in claim 1; including means for connecting segments which are selected to be in the colored stated to the negative terminal of a source of potential, and a driver control circuit operative to cause no voltage to be applied to segments which are selected to be in the bleached state during the memory time when the timepiece is being operated in its normal display mode.

3. An electronic timepiece as claimed in claim 1; comprising a control pulse generator for providing pulses for changing over the mode of display of time information, a segment driver control circuit, a clock pulse source, means operative when the time display mode is changed and until the first subsequent clock pulse occurs for connecting segments which are selected to be in the colored state to the negative terminal of a source of potential and for connecting segments which are selected to be in the bleached state to the positive terminal of said source during the memory time.

4. An electronic timepiece as claimed in claim 1; comprising means for effecting correction of the displayed time information by making the display state of the display segments change quickly, and means operative when the timepiece is in a time correction mode for connecting segments which are selected to be in the colored state to the negative terminal of a source of potential and for connecting segments which are selected to be in the bleached state to the positive terminal of said source during the memory time.

5. An electronic timepiece as claimed in claim 1; including a memorizing circuit, a clock pulse source for producing clock pulses, means for providing mode change signals for changing the display mode of the timepiece, a control pulse generator, and means for setting the electric charge transfer time and the memory time by controlling said memory circuit by means of a clock pulse, a mode change signal and a memory time setting signal derived from said control pulse generator.

6. An electronic timepiece as claimed in claim 1; further including a pair of indicating segments for indicating whether the time is AM or PM, and wherein each of said pair of indicating segments performs the function of a dummy segment with respect to the other so that no dummy segments corresponding to said indicating segments are needed.

7. An electronic timepiece as claimed in claim 1; further including AM and PM segments for indicating whether the time is AM or PM, and indicating segments for indicating a color mark, and wherein one of the AM and PM segments which is in the bleached state performs the function of a dummy segment so that no dummy electrodes corresponding to said indicating segments are needed.

8. In an electronic timepiece having circuitry for measuring time and periodically producing time signals representative of time: an electrochromic display device for displaying time information, the electrochromic display device comprising an electrolyte, display segments in contact with the electrolyte and operable to exhibit either colored or bleached states depending on the amount of electric charge held by the display segments to display time information, and dummy segments in contact with the electrolyte and operable to exhibit either colored or bleached states depending on the amount of electric charge held by the dummy segments, the dummy segments being disposed so as to be non-visible when viewed from outside the timepiece and the areas of the dummy segments being chosen in relation to the areas of the display segments so that as the total area of the colored display segments changes during the course of displaying changing time information the total combined area of the colored display segments and colored dummy segments remains substantially constant so that the coloration density of the colored display segments remains substantially unchanged and the total combined area of the bleached display segments and bleached dummy segments remains substantially constant so that the bleaching density of the bleached display segments remains substantially unchanged; and voltage applying means responsive to the time signals for periodically applying voltage between selected ones of the bleached and colored display and dummy segments to effect transfer of electric charge between the selected segments through the electrolyte to thereby periodically change the time information displayed by the electrochromic display device.

9. An electronic timepiece according to claim 8; wherein the voltage applying means comprises means for applying a negative voltage to the selected ones of the bleached segments, and means for applying a positive voltage to the selected ones of the colored segments.

10. An electronic timepiece according to claim 9; wherein the means for applying a positive voltage includes means for applying a positive voltage to only the selected ones of the colored segments and not to the remaining non-selected ones of the colored segments.

11. An electronic timepiece according to claim 8; including a power source having positive and negative voltage terminals; and wherein the voltage applying means comprises means for connecting the selected ones of the bleached segments to the negative voltage terminal, and means for connecting the selected ones of the colored segments to the positive voltage terminal.

12. An electronic timepiece according to claim 11; including circuit means coacting with the voltage applying means for periodically setting an electric charge transfer time during which the transfer of electric charges between the selected bleached and colored segments occurs and a memory time following each electric charge transfer time and during which the selected segments exhibit the bleached or colored states determined during the preceding electric charge transfer time and the non-selected segments continue to exhibit the same bleached or colored states exhibited prior to the preceding electric charge transfer time.

13. An electronic timepiece according to claim 12; including time adjusting means for effecting adjustment of the time information displayed by the display segments; and means for connecting the selected ones of the bleached segments as selected by a time adjustment operation to the negative voltage terminal during the next memory time and for connecting the selected ones of the colored segments as selected by a time adjustment operation to the positive voltage terminal during the next memory time.

14. An electronic timepiece according to claim 12; including mode changing means for selectively changing the display mode of the display elements to enable the display or different kinds of time information; and means for connecting the selected ones of the bleached segments as selected by a mode change operation to the negative voltage terminal during the next memory time and for connecting the selected ones of the colored segments as selected by a mode change operation to the positive voltage terminal during the next memory time.

15. An electronic timepiece according to claim 8; wherein the electrochromic display device includes two sets of indicating segments of equal area for indicating whether the time is AM or PM, each of said sets of indicating segments performing the function of a dummy segment with respect to the other so that no dummy segments corresponding to the indicating segments are needed.

16. An electronic timepiece according to claim 15; wherein the sets of indicating segments each comprise a signal indicating segment.

* * * * *